O. W. LUTZ.
GAS REGULATOR.
APPLICATION FILED FEB. 14, 1908.
906,810.
Patented Dec. 15, 1908.
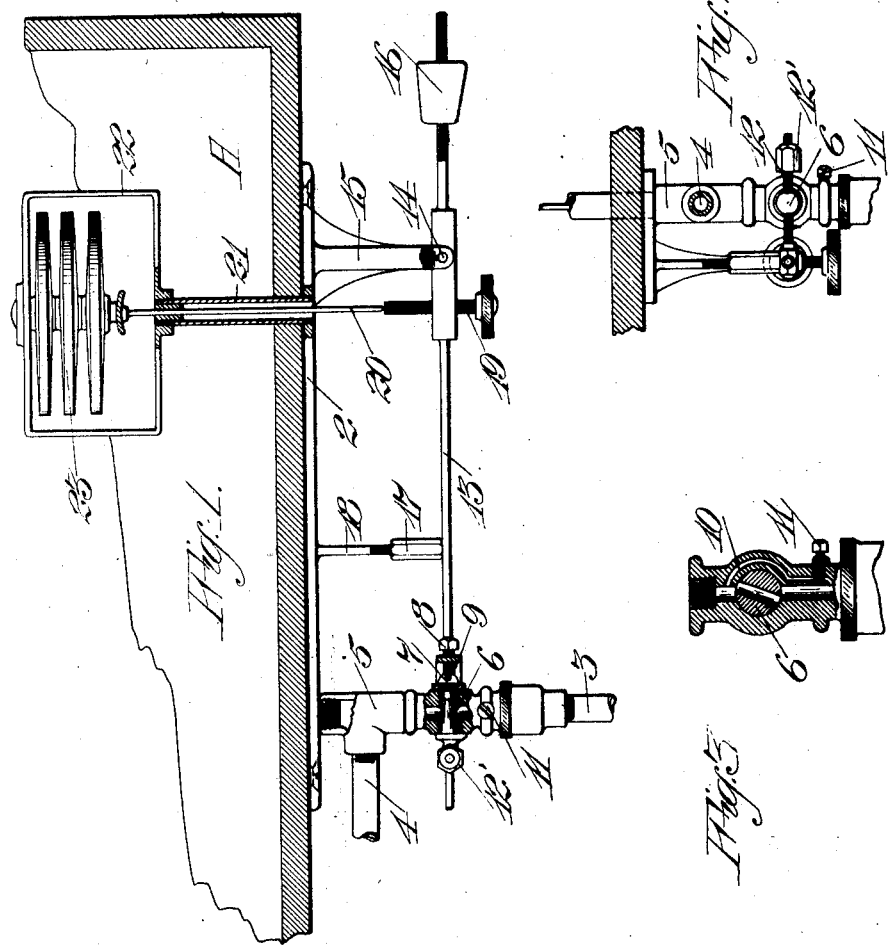
WITNESSES
INVENTOR
Otto W. Lutz.
BY
Geo. H. Strong
ATTORNEY

UNITED STATES PATENT OFFICE.

OTTO W. LUTZ, OF PETALUMA, CALIFORNIA.

GAS-REGULATOR.

No. 906,810.	Specification of Letters Patent.	Patented Dec. 15, 1908.

Application filed February 14, 1908. Serial No. 415,901.

*To all whom it may concern:*

Be it known that I, OTTO W. LUTZ, a citizen of the United States, residing at Petaluma, in the county of Sonoma and State of California, have invented new and useful Improvements in Gas-Regulators, of which the following is a specification.

My invention relates to gas and heat regulators and controllers, and pertains especially to a thermostatic arrangement for regulating the heat for incubators and the like.

Heretofore there has been great difficulty among manufacturers and users of incubators to obtain or devise an apparatus for accurately and satisfactorily regulating the heat. With large machines it has been very difficult to get an arrangement by which the heat could be equally controlled, and which will act uniformly under all conditions.
With these large incubators there has been considerable annoyance and financial loss by reason of the temperature controlling device being easily disarranged, sometimes resulting in letting in too much heat or cutting off the heat to such an extent as to be destructive of life to the chicks or eggs undergoing incubation.

The present invention has for its object the overcoming of these defects, and the assembling into a simple, compact organism all the parts necessary to make up a simple, practical gas controller for machines of any kind, and which assemblage of devices can be easily shipped and set up as a single bit of mechanism, with a minimum amount of skill required on the part of the operator in putting the controlling device in the incubator.

The invention consists of the parts and the construction and combination of parts as hereinafter more fully described and claimed, having reference to the accompanying drawings, in which—

Figure 1 is a side elevation showing the application of my invention. Fig. 2 is an end view of the regulator. Fig. 3 is a section of the valve.

A represents the egg chamber, or any chamber wherein it is desired to maintain a uniform temperature.

2 is a metal or other plate adapted to be secured to the under side of the incubator, and which plate carries all the essential parts of the heat regulating apparatus. To the under side of this plate 2 is suitably fixed a gas supply pipe 3 and a gas delivery pipe 4, these two pipes here being shown as connecting to a T 5, fixedly secured to the plate. Manifestly, though, any other desired and appropriate form of connection may be made between the pipes 3—4, and in one or the other of these pipes, as, for example, the pipe 3, is interposed a suitable regulating valve 6 which may be of any desired and appropriate construction. Preferably this valve 6 is in the form of a tapered plug valve passing through its casing and secured in place by the nut 7. As it is essential in an automatic regulator of the character herein described, that this valve be very sensitive and always free to turn, I arrange a set screw 8 suitably threaded in the bracket 9 and adapted to bear against the nut 7 on the smaller end of the valve 6. By suitably adjusting the screw 8 the valve is prevented from seating too tight.

Preferably the casing of valve 6 has a bypass 10 controlled by screw or other means 11. The object of the by-pass is always to allow sufficient gas to pass to the burner to prevent the same being extinguished, if for any reason the valve 6 should close completely. It is understood that the gas to the burner (which latter is not shown) passes from any suitable source of supply through the pipe 3 and valve 6 to the pipe 4.

The valve 6 has a counterweighted arm 12 to which is connected a lever member 13, fulcrumed at 14 to a standard 15 which is fixed rigid to plate 2. The opposite end of the lever member 13 is threaded and carries an adjustable counterweight 16, and this counterweight coacts with the counterweight 12′ on arm 12 to tend normally to open the gas valve 6. The opening movement of the valve 6 may be controlled by a nut 17, which is threaded on a stud 18 fixed also to the plate 2; this nut being elongated and arranged in the path of the lever member 13. Thus by screwing up on the nut, the arc of movement of the lever member 13 and arm 12 is increased; correspondingly, by screwing down the nut the movement of the valve is curtailed.

The lever member 13 has an enlarged portion adjacent to its fulcrum, in which is threaded the adjusting screw 19, which latter has its upper end recessed to form a seat for the needle point of the actuating rod 20. This rod 20 is guided in a piece of pipe section 21, screwed or otherwise fixedly secured in the plate 2 and extending upward therefrom. The top of the hollow guide or support 21 is provided with a stirrup or bracket 22 of suitable description, which carries an appropriate thermostat, as 23. This thermostat is so arranged with respect to the rod 20 that as the heat in the chamber A increases, the thermostat, in expanding, will act on the rod 20 at the appropriate time to rock the lever 13, and correspondingly move the valve to reduce the flow of gas to the burner.

The character of the thermostat and the special support therefor are not material so long as the desired results are produced. The arrangement here shown, however, is one adapted for practical purposes, and such as has been tried and found successful.

It is usual to make flexible connections, as by means of a rubber hose, with the outer ends of the pipe sections 3—4 to obviate twists and strains due to possible expansion and contraction of the parts.

By having all the essential parts of this apparatus fixed to and carried by the plate 2, there has been found to be no danger of disarranging the parts, or affecting their sensitiveness of operation, or otherwise interfering with the equitable heating arrangements, as has been the case, and is the case, in other regulating devices used for this purpose.

Having thus described my invention, what I claim and desire to secure by Letters Patent is—

1. In a gas regulating device, the combination of a plate, a gas-supply pipe and a gas-delivery pipe fixedly secured to the under side of said plate, a regulating-valve in one of said pipes, a counterweighted-arm on the valve, a standard fixed to the under side of said plate, a counterweighted-lever fulcrumed to the standard and arranged parallel with the plate, an adjustable-counterweight on one end of the lever, said lever operative on said arm, an adjustable stop fixed to and depending from said plate for limiting the oscillating movement of the lever-member, and an adjusting-screw carried by the lever and adapted to form a seat for a companion part.

2. In a gas regulating device, the combination of a gas supply pipe section and a gas delivery pipe section connected thereto, a support for said sections, a regulating valve in one of the sections, said valve in the form of a tapered plug, a counterweighted arm on the valve, a counterweighted lever member operative on said arm, an actuating rod operative on said lever member, and a unitary support for said pipe sections, said lever member and said actuating rod.

3. In a gas regulating device, the combination of a gas supply pipe section and a gas delivery pipe section connected thereto, a support for said sections, a regulating valve in one of the sections, said valve in the form of a tapered plug, a counterweighted arm on the valve, a counterweighted lever member operative on said arm, an actuating rod operative on said lever member, a unitary support for said pipe sections, said lever member and said actuating rod, and an adjustable stop member carried by said support for limiting the oscillating movement of said lever member.

In testimony whereof I have hereunto set my hand in presence of two subscribing witnesses.

OTTO W. LUTZ.

Witnesses:
FRANK A. WARD,
ALBERT C. DALE.